United States Patent [19]

Hecker et al.

[11] 4,030,109
[45] June 14, 1977

[54] APPARATUS FOR CONTROLLING A PHOTOGRAMMETRICAL CAMERA

[75] Inventors: Gerhard Ernst Hecker; Heinrich Peter Klose; Wilfried Friedrich Heinrich Muller, all of Jena, Germany

[73] Assignee: Jenoptik Jena G.m.b.H., Jena, Germany

[22] Filed: May 5, 1975

[21] Appl. No.: 574,995

[52] U.S. Cl. .................. 354/68; 354/65; 354/106; 350/160 LC
[51] Int. Cl. .......................... G03b 39/00
[58] Field of Search .......... 354/65, 68, 71, 75, 354/76, 105, 106, 107, 94, 95, 96, 98, 99, 196; 340/166 EL; 350/160 LC

[56] References Cited

UNITED STATES PATENTS

| | | | |
|---|---|---|---|
| 3,526,711 | 9/1970 | Boer | 340/166 EL |
| 3,716,658 | 2/1973 | Rackman | 350/160 LC |
| 3,727,527 | 4/1973 | Borowski et al. | 350/160 LC X |
| 3,890,628 | 6/1975 | Gurtler | 354/227 |
| 3,914,019 | 10/1975 | Byatt | 350/160 LC |

*Primary Examiner*—L. T. Hix
*Assistant Examiner*—Alan Mathews

[57] ABSTRACT

An apparatus for controlling a photogrammetrical camera includes a frosted glass adjacent to which or in an optically conjugate plane thereto a transparent planoparallel sheet of voltage sensitive material is arranged. Spaced electrodes are allocated to the one face of said sheet and a sheet electrode to the other face. Each of the spaced electrodes is connected to respective outputs of an electronic counter, which in dependence of a tunable pulse generator applies voltage pulses to the spaced electrodes and the sheet electrode, both sandwiching said sheet of voltage sensitive material and rendering visible the inbetween portions of said material when submitted to a potential so that lines or a cyclic pattern of lines appear. The voltage sensitive material can be liquid or gaseous or solid and can be sandwiched between two substantially plano-parallel plates which have the respective electrodes or electrode on their inner faces.

3 Claims, 5 Drawing Figures

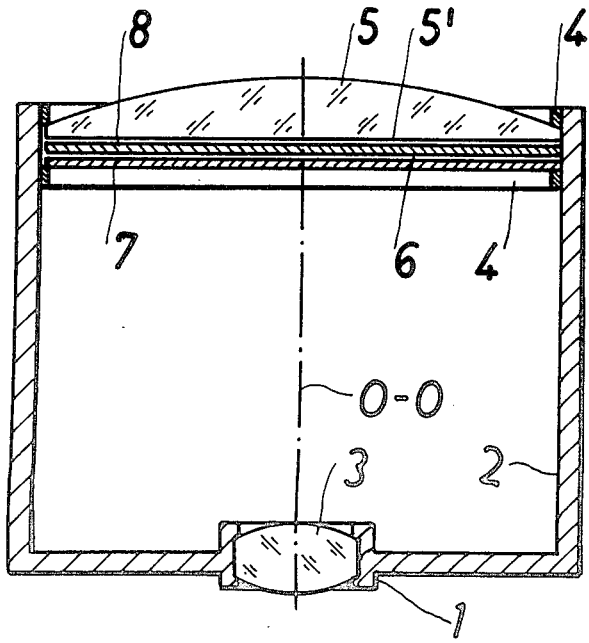

APPARATUS FOR CONTROLLING A PHOTOGRAMMETRICAL CAMERA

This invention relates to an apparatus for controlling a photogrammetrical camera for imaging a scanned area upon a frosted glass, which co-operates with at least one scanning mark adjustable to move synchronously, with the same velocity and in the same direction as the image does. When taking serial photographs of an area from the air, photogrammetrical cameras are used, the photographing cyclus of which, as well as the drifty compensation etc. are controlled by a corresponding device, which particularly supervises the superposition of subsequent pictures with respect to their contents. This is achieved by the movement of an endless lattice relative to an adjacently located optical imaging system, which reproduces at least a section of the scanned area on a frosted glass through a field lens. The speed and the direction of the movement of the endless lattice is brought into conformity with the speed and direction of the movement of the scanned area so that the endless lattice seems to standstill relative to the moving pictures. The endless lattice runs, in analogy to an endless belt, over pulleys driven by a servo-motor of steadily controllable speed. The known arrangements are disadvantageous because electromotorical and mechanical drive means are required to steadily move the endless lattice, both means technologically and operationally burden the device which has to ensure the conformity.

A lattice belt, just as a spiked ribbon replacing the first one, are both comparatively costly components. The motor and the gears for driving a lattice belt are subject to considerable wear, and when a wide range has to be controlled expensive servo-motors are required.

Since a lattice belt is a somewhat bulky means, it cannot extend over the entire frosted glass, which would be desirable when surveying an area of poor detail, since otherwise the control apparatus and the superposition controller, respectively, would be of considerable dimensions at least in the proximity of the frosted glass. Furthermore, the lattice belt appears in the field of observation of the optical imaging system even when undesired.

It is an object of the present invention to obviate the above disadvantages.

It is a further object of the present invention to provide an apparatus for photogrammetrical cameras at least possible expenditures, which permits comparatively small dimensions and which substantially eliminates wear.

It is a final object of the present invention to provide an apparatus for photogrammetrical cameras of a wide control range, and in which the lattice can optionally be rendered visible or invisible. According to the invention these objects are realised in that a transparent substantially plano-parallel sheet of voltage sensitive material is arranged at least adjacent to a frosted glass or in a plane conjugated thereto.

Said sheet of the above properties carries on its one face a plurality of striplike electrodes and on its other face a sheet electrode. Each of said strip electrodes is connected to the output of a counter, which in turn is controlled by a tunable pulse generator, for subsequently supplying the spaced electrodes with voltage pulses. The material of the transparent sheet sandwiched between the individual strip electrodes and the sheet electrode is rendered visible in accordance with the cycle of voltage pulses successively applied to the individual spaced electrodes.

The material of the transparent sheet may be selected from a rare gas, or a liquid crystal, or a ceramics. When the material of the sheet is a gas or a liquid, it is preferably sandwiched between two substantially plano-parallel transparent members, forming a cell, the faces of said members, which lie opposite to said material, are provided with the spaced electrodes and the sheet electrode, respectively.

To obtain a continuous, simulated movement of a visible line in the respective material of the sheet along the frosted glass, the electrodes are preferably spaced at $\leq 1$ mm and the control circuit supplies parallel pulses to a plurality of spaced electrodes which are not located adjacent, however, at a fixed sequence to each other. The invention permits the production of a compact control apparatus at reasonable costs, in which any mechanincal and electro-mechanical elements, which effect a superposition control, and which are subject to wear and limitations in operation, are eliminated.

The invention further permits th production of a control apparatus with improved operation properties, due to the application of a line or sequence of lines at a variable space, in which the line, respectively lines, extend over the entire frosted glass, and can be rendered visible or invisible at will.

Ring counters, shift registers, or decoded binary counters may be employed as counters, which in accordance with an inherent cycle successively supply the spaced electrodes according to a time pattern with voltage pulses. In order that the invention may be more readily understood, reference is made to the accompanying drawings, which illustrate diagrammatically and by way of example two embodiments thereof and in which:

FIG. 1 shows a longitudinal section of a control apparatus,

FIG. 2 a top view of a field lens,

FIG. 3 a section through a liquid crystal,

FIG. 4 a circuit for controlling said liquid crystal, and

FIG. 5 is an alternate circuit for controlling said liquid crystal.

In FIG. 1 an objective 3 having an optical axis 0-0 is arranged in a lens mount 1 worked in a housing 2. In opposite part of said housing 2 a field lens 5, the optical axis of which coincides with the optical axis of said objective 3, is mounted in a socket 4 together with a sandwich arrangement of a plano-parallel glass plate 7, a thin layer 6 and a plano-parallel glass plate 8. The bottom side face 5' of said field lens 5 is frosted. The material of said layer 6 is voltage sensitive (FIG. 3) and partially varies its light transmissivity when subject to an electric field.

A sheet electrode 11, connected to a not shown voltage source, covers the inner face 10 of the glass plate 7, whereas the inner face 12 of the glass plate 8 carries spaced strip electrodes 13, which are arranged parallel to and insulated from each other. The electrodes 11 and 13, as well as the frosted glass 5' lie in the focussing range, substantially in the focal plane of said objective 3.

The objective 3 images a scanned area (not represented) on the frosted glass 5' for observation. A voltage source (not represented) supplies the sheet electrode 11 permanently and the spaced electrodes 13 successively with a voltage and produces a potential between respective electrodes 13 and 11, which renders visible the material within said thin layer 6, so that a line or lines 14 (FIG. 2) appear on the frosted glass 5′.

In FIG. 4 a circuit is shown for control of the sheet electrode 11 and the spaced electrodes 13 which sandwich a liquid crystal 15. The sheet electrode is connected to a voltage source 16 and the spaced electrodes 13 to the outputs 17 of a shift register 18. A tunable pulse generator 19 feeds pulses into said shift register as well as into a further electronic circuit 20 which controls operation in a camera (not shown) such as the actuation of the camera release, the film feed etc.

The pulses from the shift register 18 successively build up short-lived potentials between the spaced electrodes 13 and the sheet electrode 11 so that a line 14 (FIG. 2) is rendered visible on the frosted glass 5;40 of the field lens 5. The line moves across the frosted glass 5′ at the pulse generator 19 frequency. A feedback 21 between input and output of the shift register 18 effects that the first of the sheet electrodes 13 is only energized when the last of said sheet electrodes in the sequence has been pulsed and a subsequent pulse form the pulse generator 19 arrives at the shift register 18. The liquid crystal 15 can be replaced by another material. When a gaseous material is employed the strip electrodes are preferably embodied by electrical wiring so that an applied potential effects a glow discharge.

When a solid material is used, the glass plates 7, 8 can be omitted.

In FIG. 5 a tunable pulse frequency generator 22 is connected to a ring counter 24 and to an electronic circuit 23 for operating a camera (not shown).

Due to feedback, the ring counter 24 starts a new counting sequence when the last counting place is occupied.

The counter 24 is connected with its outputs $26^1$, $26^2$, $26^3$, $26^4$, $26^5$ to strip electrodes 27, 28, 29, 30, 31 each of which is in parallel connection to strip electrodes $27^1$, $27^2$ etc. $28^1$, $28^2$ etc. $29^1$, $29^2$ etc. $30^1$, $30^2$ etc.

The strip electrodes 27 to 31 are opposed by a sheet electrode 32 connected to a voltage source 33.

The electrodes 27 to 32 belong to a liquid crystal 34, which can be embodied and arranged as shown and described with respect to FIG. 1. The respective parallel connected electrodes 27, $27^1$, $27^2$, . . . , 28, $28^1$, $28^2$, . . .; 29, $29^1$, $29^2$. . . ; 30, $30^1$, $30^2$, . . . ; 31; . . . (to the latter no parallel electrodes are shown in the drawing for reasons of more simplicity) are simultaneously supplied with a voltage pulse via the respective outputs of the ring counter 24, for example $26^1$ supplies the parallel electrodes 27, $27^1$, $27^2$ etc. Due to a potential between the respective strip electrodes, for example 27, $27^1$, $27^2$. . . , and the plate electrode 32 the intermediate liquid crystal 34 is rendered visible and produces slender diffuse lines 14 (FIG. 2).

The subsequent voltage pulse is applied to the electrodes 28, $28^1$, $28^2$ etc. via the output $26^2$, thus rendering visible the respective material sandwiched by said electrodes and the sheet electrode 32.

In this manner the operation is pursued up to the last output at the ring counter 24. A feed back signal via feedback connection 25 starts a new cycle as described hereinabove.

Thus a simulated movement of continuously running lines 14 (FIG. 2) is produced on the frosted glass 5′, when a sufficient number of strip electrodes 27 to 31 is provided.

The simulated movement of the lines 14 is adapted to the speed of the travelling pictures of the supervised area, produced on the frosted glass 5′ by operation of the control apparatus.

We claim:

1. An apparatus for control of a photogrammetrical camera, comprising
   an imaging system,
   a frosted glass arranged in the image plane of said imaging system,
      said imaging system being adapted to image an object to be photographed onto said frosted glass,
   a voltage sensitive material of variable optical transmissivity,
      said material forming a plano-parallel sheet and being located adjacent to said frosted glass,
      said sheet having a plurality of strip electrodes on one of its faces and a sheet electrode on the other of its faces,
   an electronic counter,
      each of said strip electrodes being connected to an output of said electronic counter,
   and a tunable pulse generator connected to said counter,
      said counter successively applying voltage pulses from said tunable pulse generator to said strip electrodes for producing potentials between said strip electrodes and said sheet electrode,
      said pulse generator being adapted to control the frequency of said voltage pulses.

2. A control apparatus as claimed in claim 1, wherein said sheet of voltage sensitive material is sandwiched between two substantially plano-parallel transparent plates, both having said strip electrodes and said plate electrode, respectively, on the inner faces.

3. A control apparatus according to claim 1, wherein at least two non-adjacent strip electrodes, equally spaced from each other, are connected to one and the same output of the counter.

* * * * *